US008890807B2

(12) United States Patent
Lee et al.

(10) Patent No.: US 8,890,807 B2
(45) Date of Patent: Nov. 18, 2014

(54) APPARATUS AND METHOD FOR CONTROLLING OBJECT

(75) Inventors: Hyun Jeong Lee, Seoul (KR); Jae Joon Han, Seoul (KR); Joon Ah Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 434 days.

(21) Appl. No.: 13/137,007

(22) Filed: Jul. 14, 2011

(65) Prior Publication Data

US 2012/0038551 A1   Feb. 16, 2012

(30) Foreign Application Priority Data

Aug. 16, 2010   (KR) .................... 10-2010-0078692

(51) Int. Cl.
*G06F 3/033*   (2013.01)
*G09G 5/08*   (2006.01)
*G06F 3/0346*   (2013.01)

(52) U.S. Cl.
CPC .................. *G06F 3/0346* (2013.01)
USPC ........................................ 345/157

(58) Field of Classification Search
None
See application file for complete search history.

(56) References Cited

U.S. PATENT DOCUMENTS

| 2008/0059131 | A1* | 3/2008 | Tokita et al. ................ 703/5 |
| 2009/0147008 | A1  | 6/2009 | Do et al. |
| 2010/0095249 | A1* | 4/2010 | Yoshikawa et al. ........... 715/856 |
| 2010/0097309 | A1* | 4/2010 | Nishida et al. ............... 345/156 |
| 2011/0007037 | A1* | 1/2011 | Ogawa ....................... 345/179 |

FOREIGN PATENT DOCUMENTS

| KR | 10-2004-0013336 | 2/2004 |
| KR | 10-2005-0121126 | 12/2005 |
| KR | 10-2006-0040704 | 5/2006 |

* cited by examiner

*Primary Examiner* — Nicholas Lee
(74) *Attorney, Agent, or Firm* — Staas & Halsey LLP

(57) ABSTRACT

An object controlling apparatus and method are provided. An object of a virtual world may be more intuitively and readily manipulated by controlling an operation, a state, a shape, and the like of the object based on transform information associated with the object and a pointing signal for manipulating the virtual that is received from an input device. In addition, by manipulating the object based on information matching the input pointing signal between internal transform information and total transform information, a unique transform operation may be assigned to each object and thus, the user may be provided with a variety of functions. Here, the internal transform information is uniquely set for each object and the total transform information is set to be commonly applied to all the objects of the virtual world.

18 Claims, 21 Drawing Sheets

200

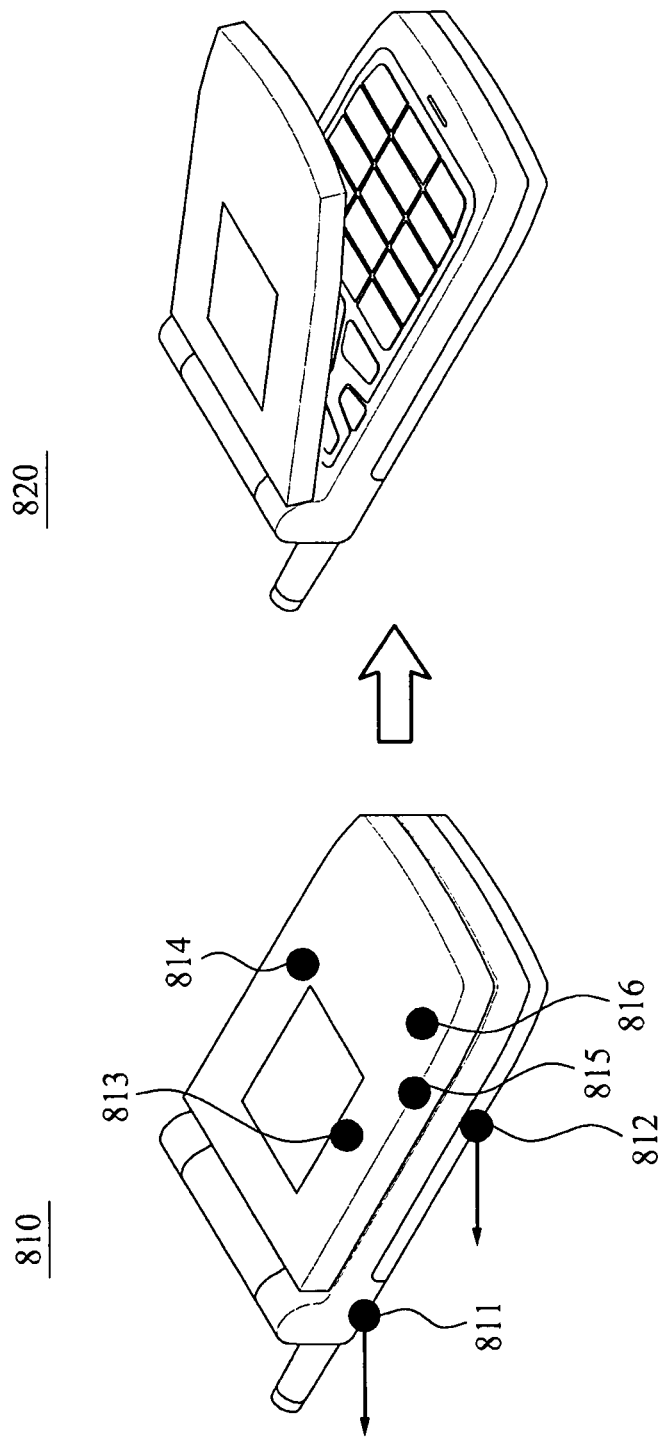

APPARATUS AND METHOD FOR CONTROLLING OBJECT

CROSS-REFERENCE TO RELATED APPLICATIONS

This application claims the priority benefit of Korean Patent Application No. 10-2010-0078692, filed on Aug. 16, 2010, in the Korean Intellectual Property Office, the disclosure of which is incorporated herein by reference.

BACKGROUND

1. Field

One or more example embodiments relate to an apparatus and method of controlling an object, and more particularly, to an object controlling apparatus and method for controlling an object of a virtual world.

2. Description of the Related Art

Currently, user interfaces, games, movies, and the like using a three-dimensional (3D) virtual world have been actively developed. With time, the 3D virtual world has been developed from a simple configuration three-dimensionally illustrating an object to various configurations using a method of enhancing a variety of visual effects, interesting elements, real sense, and the like.

With developments in the 3D virtual world, research is being actively conducted on a method of controlling an object, for example, an avatar in the virtual world.

However, an existing method of controlling an object of the virtual world is generally performed using a simple operation input method, for example, a method of executing a menu of the object such as select, move and rotate, enlarge and reduce, and the like.

SUMMARY

The foregoing and/or other aspects are achieved by providing an object controlling apparatus, including an input unit to receive, from an input device, a pointing signaling for manipulating an object of a virtual world, a database to store object information associated with the object, and a controller to control at least one of an operation, a state, and a shape of the object based on the pointing signal and the object information.

The foregoing and/or other aspects are achieved by providing an object controlling apparatus for controlling an object of a virtual world, including an input unit to receive a pointing signal from an input device, a database to store internal transform information associated with an internal transform of the object and total transform information associated with a total transform of the object, a first decision unit to determine whether the pointing signal corresponds to a valid input signal, a second decision unit to determine whether the pointing signal matches the internal transform information, when the pointing signal corresponds to the valid input signal, and a controller to control the internal transform of the object based on the internal transform information when the pointing signal matches the internal transform information, and to control the total transform of the object based on the total transform information when the pointing signal does not match the internal transform information.

The foregoing and/or other aspects are achieved by providing an object controlling method including receiving, from an input device, a pointing signal for manipulating an object of a virtual world, and controlling at least one of an operation, a state, and a shape of the object based on the pointing signal and object information associated with the object stored in a database.

The foregoing and/or other aspects are achieved by providing an object controlling method of controlling an object of a virtual world, including receiving a pointing signal from an input device, determining whether the pointing signal corresponds to a valid input signal, determining whether the pointing signal matches internal transform information associated with an internal transform of the object stored in a database, when the pointing signal corresponds to the valid input signal, and controlling the internal transform of the object based on the internal transform information when the pointing signal matches the internal transform information, and controlling a total transform of the object stored in the database when the pointing signal does not match the internal transform information.

The foregoing and/or other aspects are achieved by providing an object controlling apparatus. The object controlling apparatus includes an input unit to receive, from an input device, a pointing signal for manipulating an object of a virtual world based on an input signal sensed from a user, and a controller to control at least one of an operation, a state, and a shape of the object based on the received pointing signal, wherein the received pointing signal includes one of a first pointing signal for internally transforming the object and a second pointing signal for totally transforming the object.

The object controlling apparatus also may include a first decision unit to determine whether the input pointing signal is valid depending on whether the input pointing signal matches one of a stored pointing signal for internal transform of the object and a stored pointing signal for total transform of the object.

The object controlling apparatus also may include a second decision unit to determine whether the pointing signal matches the internal transform information when the pointing signal is determined as the valid input signal by the first decision unit, and to determine that the input pointing signal matches the internal transform information when the input pointing signal matches stored pointing signal for internal transform of the object In the object controlling apparatus, the second decision unit may determine that the input pointing signal matches the total transform information when the input pointing is determined as the valid input signal by the first decision unit but does not match the stored pointing signal for internal transform of the object.

The object controlling apparatus also may include a controller to control the internal transform of the object based on the internal transform information when the second decision unit determines that the input pointing signal matches the internal transform information and to control the total transform of the object based on the total transform information when the second decision unit determines that the input pointing signal does not match the internal transform information.

The object controlling apparatus also may include a database to store the internal transform information associated with the internal transform of the object and the total transform information associated with the total transform of the object.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 8A and FIG. 8B illustrate an operation of an object controlling apparatus controlling a folder phone of a virtual world according to example embodiments;

DETAILED DESCRIPTION

Figure 1:
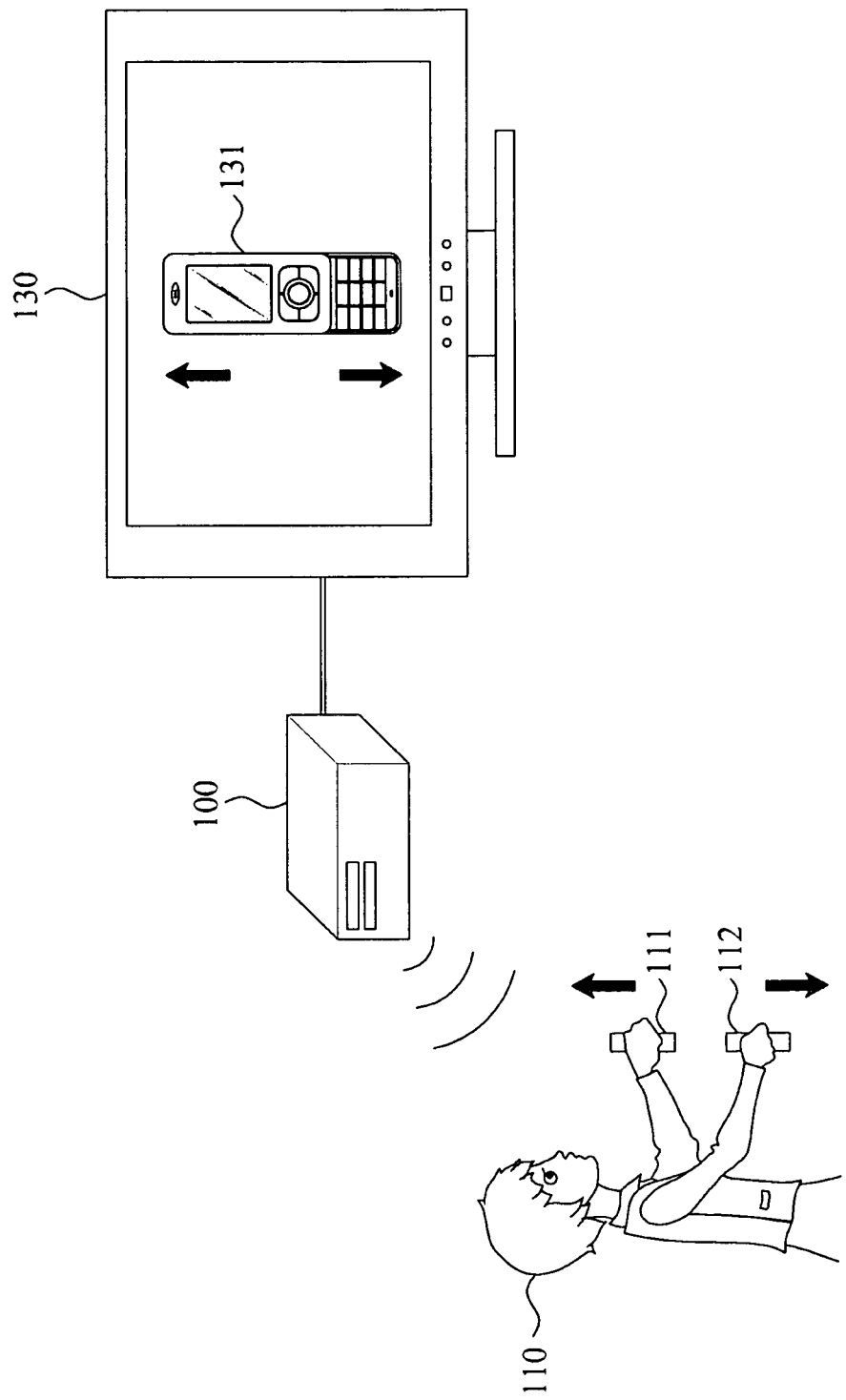
FIG. 1 illustrates an operation of an object controlling apparatus receiving a pointing signal from an input device, and manipulating an object of a virtual world according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an operation of an object controlling apparatus 100, which receives a pointing signal from an input device and manipulates an object of a virtual world according to example embodiments.

Referring to FIG. 1, the object controlling apparatus 100 may receive a pointing signal from an input device, including a first input device 111 or a second input device 112, or both, to manipulate an object 131 of a virtual world 130.

A user 110 of a real world may input, as an input signal, an operation, a state, an intent, a shape, and the like of the user 110 in the input device. The input device may generate the pointing signal for controlling the object 131 of the virtual world 130 based on the input signal. Depending on example embodiments, the input device may generate a plurality of pointing signals.

The input device may transmit the pointing signal to the object controlling apparatus 100.

The input device may act as a device to receive, from the user 110 of the real world, a signal or a command for manipulating the object 131 of the virtual world 130.

For example, the input device may be a motion sensor to sense a motion of the user 110 of the real world. When the user moves the motion sensor, the motion sensor may sense a motion of the user 110 and may generate a pointing signal for manipulating the object 131 of the virtual world 130 based on the sensed motion of the user 110.

The input device may be a touch screen of a portable terminal. When the user 110 of the real world touches the touch screen of the portable terminal to input a click, a double click, a tap, a double tap, a drag, and the like, the touch screen may sense an input signal of the user 110 and generate a pointing signal for manipulating the object 131 of the virtual world 130 based on the sensed input signal.

The input device may be a combination of a plurality of devices.

The input device may correspond to a device that is installed at an end joint of a finger of the user 110 to sense a motion of the finger of the user 110. When the user 110 generates an input signal using a device sensing the motion of the finger, the device sensing the motion of the finger may sense the input signal of the user 110 and generate a pointing signal for manipulating the object 131 of the virtual world based on the sensed input signal.

The input device may be a keyboard or a mouse. When the user 110 inputs an input signal using the keyboard or the mouse, the keyboard or the mouse may sense the input signal of the user 110 and generate a pointing signal for manipulating the object 131 of the virtual world 130 based on the sensed input signal.

The object controlling apparatus 100 may control the object 131 of the virtual world 130. The object controlling apparatus 100 may receive, from the input device, the pointing signal for controlling the object 131 of the virtual world 130 and may control at least one of an operation, a state, and a shape of the object 131 based on the input pointing signal.

The object controlling apparatus 100 may control at least one of the operation, the state, and the shape of the object 131 based on object information associated with the object 131 of the virtual world 130 as well as the pointing signal.

For example, the user 110 may input, in the input device, an operation of lifting up the first input device 111 and putting down the second input device 112.

The input device may sense the input operation of the user 110 and generate the pointing signal for manipulating the object 131 of the virtual world 130 based on a signal of the sensed operation. The input device may transmit the pointing signal to the object controlling apparatus 100.

The object controlling apparatus 100 may control the shape of the object 131 of the virtual world 130 based on the input pointing signal, for example, a signal about an operation of lifting up a corresponding object and putting down the corresponding object, and object information associated with the object 131 of the virtual world 130, for example, information regarding a form of a slide phone of which an upper portion slides to be opened.

Figure 2:
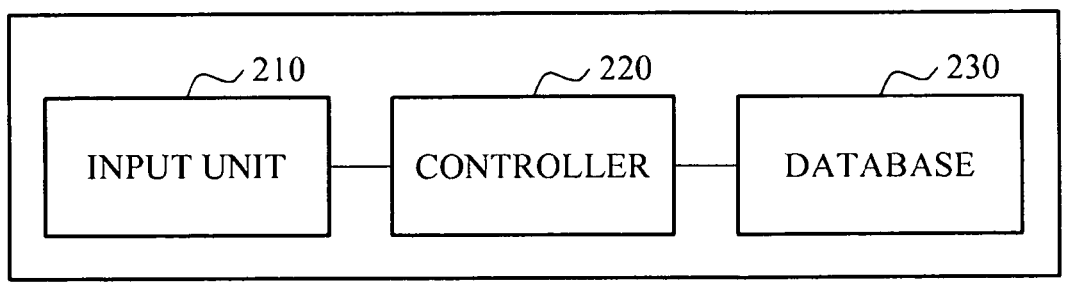
FIG. 2 illustrates a configuration of an object controlling apparatus according to example embodiments.

FIG. 2 illustrates a configuration of an object controlling apparatus 200 according to example embodiments.

Referring to FIG. 2, the object controlling apparatus 200 may include, for example, an input unit 210, a controller 220, and a database 230.

The input unit 210 may receive, from an input device, a pointing signal for manipulating an object of a virtual world. The input unit 210 may receive a plurality of pointing signals from the input device.

The pointing signal may be a coordinate value using 3D pointing coordinates. The object of the virtual world may have a local coordinate system. The pointing signal may be a coordinate value expressed using the local coordinate system of the object.

Table 1 shows a data format of a pointing signal when an input signal is input from each of two input devices.

TABLE 1

| Button$_1$ on/off | x$_1$, y$_1$, z$_1$ | Button$_2$ on/off | x$_2$, y$_2$, z$_2$ |
|---|---|---|---|

Referring to Table 1, the pointing signal when the input signal is input from two input devices, for example, a first input device and a second input device may include a field (Button$_1$ on/off) indicating whether an input signal from the first input device is present, a field (x$_1$, y$_1$, z$_1$) indicating a 3D pointing coordinate value of the input signal when the input signal from the first input device is present, a field (Button$_2$ on/off) indicating whether an input signal from the second input device is present, and a field (x$_2$, y$_2$, z$_2$) indicating a 3D pointing coordinate value of the input signal when the input signal from the second input device is present.

The database 230 may store object information associated with the object of the virtual world.

The object may include at least one subpart. The object information may include at least one of identification information used to identify the at least one subpart and transform information associated with a transform of the at least one subpart.

The transform information may include at least one of translation information associated with a translation of the at least one subpart, rotation information associated with a rotation of the at least one subpart, and scaling information associated with scaling of the at least one subpart.

Table 2 shows a data format indicating object information associated with the object.

TABLE 2

| Model_id | # of subpart |
|---|---|

Referring to Table 2, object information associated with the object may include a field (Model_id) used to identify the object and a field (# of subpart) indicating a number of subparts included in the object.

Table 3 shows a data format indicating subpart information associated with subparts included in the object.

TABLE 3

| subpart_id | subpart_Model_data | Children_subpart_ids | |
|---|---|---|---|
| Translation_center ($O_{xt}$, $O_{yt}$, $O_{zt}$) | Translation_vectors (ex. $\Delta x$, $\Delta y$, $\Delta z$) | Translation_base_subpart_ids | Translation_range (ex. min, max) |
| Rotation_center(x, y, z) ($O_{xr}$, $O_{yr}$, $O_{zr}$) | Rotation_vectors (ex. $\Delta\theta_x$, $\Delta\theta_y$, $\Delta\theta_z$) | Rotation_base_subpart_ids | Rotation_range (ex. min, max) |
| Scaling_center ($O_{xs}$, $O_{ys}$, $O_{zs}$) | Scaling_vectors (ex. $\Delta S_x$, $\Delta S_y$, $\Delta S_z$) | Scaling_base_subpart_ids | Scaling_range (ex. min, max) |

Referring to Table 3, subpart information may include a field (subpart_id) used to identify a corresponding subpart, a field (subpart_Model_data) indicating model information of the subpart, a field (Children_subpart_ids) used to identify children subparts, translation information associated with a translation of the subpart, rotation information associated with a rotation of the subpart, and scaling information associated with the scaling of the subpart.

Referring to Table 3, the translation information may include a translation center (Translation_center), a translation vector (Translation_vectors), a translation base subpart ID (Translation_base_subpart_ids), and a translation range (Translation_range).

The translation center may indicate a center point that is a standard of the translation of the subpart. Depending on example embodiments, the translation center may be a coordinate value based on local coordinates of the object.

The translation vector may indicate a value of expressing, as a vector, a translation distance and direction of the subpart based on the coordinate value of the translation center. Depending on example embodiments, the translation vector may be a difference value between a coordinate value before the translation and a coordinate value after the translation based on the local coordinates of the object.

The translation base subpart ID may indicate a standard subpart of the object with respect to a translation transform of the subpart.

The translation range may indicate a minimum value and a maximum value of a translatable distance of the subpart.

Referring to Table 3, rotation information may include a rotation center (Rotation_center), a rotation vector (Rotation_vectors), a rotation base subpart ID (Rotation_base_subpart_ids), and a rotation range (Rotation_range).

The rotation center may indicate a center point that is a standard of the rotation of the subpart. Depending on example embodiments, the rotation center may be a coordinate value based on local coordinates of the object.

The rotation vector may indicate a value of expressing, as a vector, a rotation angle of the subpart based on the coordinate value of the rotation center. Depending on example embodiments, the rotation vector may include a difference value between an angle value before the rotation and an angle value after the rotation based on the local coordinates of the object.

The rotation base subpart ID may indicate a standard subpart of the object with respect to a rotation transform of the subpart.

The rotation range may indicate a minimum value and a maximum value of a rotatable angle of the subpart.

Referring to Table 3, scaling information may include scaling center (Scaling_center), a scaling vector (Scaling_vectors), a scaling base subpart ID (Scaling_base_subpart_ids), and a scaling (Scaling_range).

The scaling center may indicate a center point that is a standard when scaling of the subpart varies. Depending on example embodiments, the scaling center may be a coordinate value based on local coordinates of the object.

The scaling vector may indicate a value of expressing, as a vector, changed scaling of the subpart based on the coordinate value of the scaling center. Depending on example embodiments, the scaling vector may be a difference value between scaling before the scaling change and scaling after the scaling change based on the local coordinates of the object.

The scaling base subpart ID may indicate a standard subpart of the object with respect to a scaling transform of the subpart.

The scaling range may indicate a minimum value and a maximum value of changeable scaling of the subpart.

The subpart of the object and object information will be further described with reference to FIG. 4A through FIG. 8B.

The controller 220 may control at least one of an operation, a state, and a shape of the object based on the input pointing signal and object information stored in the database 230.

Figure 3:
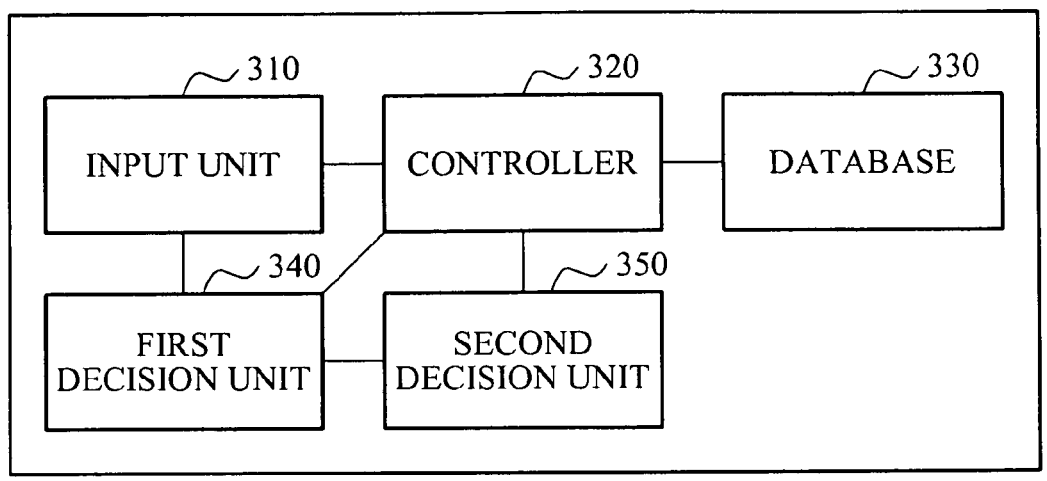
FIG. 3 illustrates a configuration of an object controlling apparatus according to other example embodiments.

FIG. 3 illustrates a configuration of an object controlling apparatus 300 according to example embodiments.

Referring to FIG. 3, the object controlling apparatus 300 may include, for example, an input unit 310, a controller 320, a database 330, a first decision unit 340, and a second decision unit 350.

The input unit 310 may receive a pointing signal from an input device. The input unit 310 may receive a plurality of pointing signals from the input device.

The database 330 may store internal transform information associated with an internal transform of an object of a virtual world and total transform information associated with a total transform of the object. The internal transform information may include a pointing signal for internally transforming the object. The total transform information may include a pointing signal for totally transforming the object.

The object of the virtual world may include at least one subpart. The internal transform information may include at least one of identification information used to identify the at least one subpart, translation information associated with a translation of the at least one subpart, rotation information associated with a rotation of the at least one subpart, and scaling information associated with scaling of the at least one subpart.

The internal transform may indicate a unique transform of the object set for each object. The total transform may indicate a transform set to be commonly applied to all the object(s) in the virtual world. For example, the total transform may indicate an enlargement, a reduction, a rotation, and the like of the object(s). In the case of a slide phone, the internal transform may indicate a transform of the slide phone sliding to be opened, a transform of the slide phone sliding to be closed, a transform whereby a button of the slide phone is pressed, and the like.

The internal transform information may include a pointing signal for the internal transform of the object. A pointing signal for the internal transform may be set to be different for each object. The total transform information may include a pointing signal for the total transform of the object(s). A pointing signal for the total transform may be set to be different for each object.

A user may change internal transform information of the object. For example, the user may update the internal transform information by storing the received internal transform information in the database 330.

The user may change total transform information of the object(s). For example, the user may set total transform information of the object(s) and input the set total transform information into the object controlling apparatus 300. The object controlling apparatus 300 may update the total transform information of the object(s) by storing the received total transform information in the database 330.

The first decision unit 340 may determine whether an input pointing signal corresponds to a valid input signal. The first decision unit 340 may determine whether the input pointing signal corresponds to the valid input signal, depending on whether the input pointing signal matches one of a pointing signal for internal transform of the object and a pointing signal for total transform of the object that are stored in the database 330. For example, when the input pointing signal matches one of pointing signals stored in the database 330, the first decision unit 340 may determine the input pointing signal as the valid input signal.

When the pointing signal is determined as the valid input signal, the second decision unit 350 may determine whether the pointing signal matches the internal transform information. When the input pointing signal matches the pointing signal for the internal transform of the object that is included in internal transform information stored in the database 330, the second decision unit 350 may determine the input pointing signal matches the internal transform information.

When the input pointing signal is determined to match the internal transform information, the controller 320 may control the internal transform of the object based on the internal transform information. When the input pointing signal is determined to not match the internal transform information, the controller 320 may control the total transform of the object(s) based on the total transform information.

Hereinafter, an operation of an object controlling apparatus to control an object according to example embodiments will be described with reference to FIG. 4A through 8B.

Figure 4A:
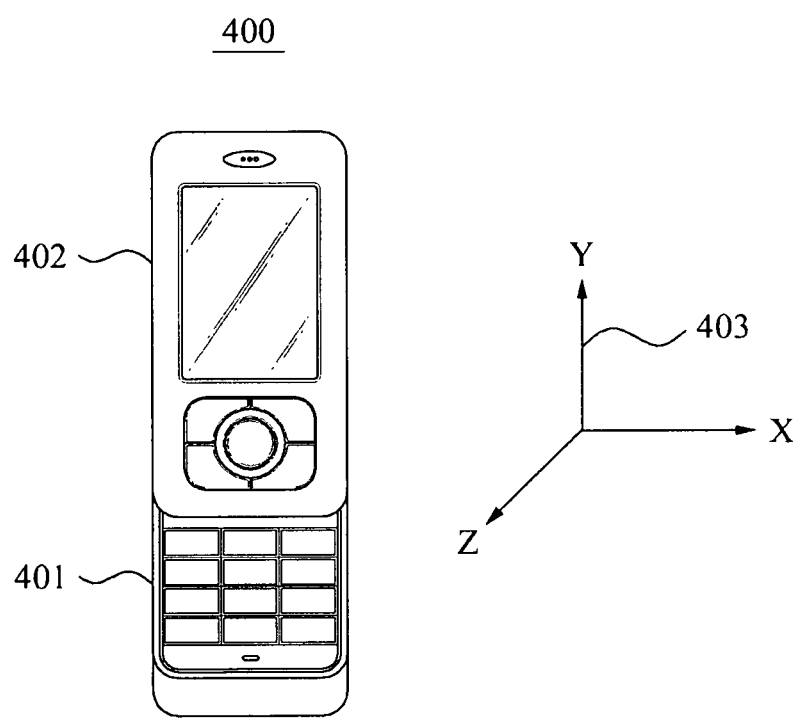
FIG. 4A through FIG. 4C illustrate an operation of an object controlling apparatus controlling a slide phone of a virtual world according to example embodiments.
Figure 4B:
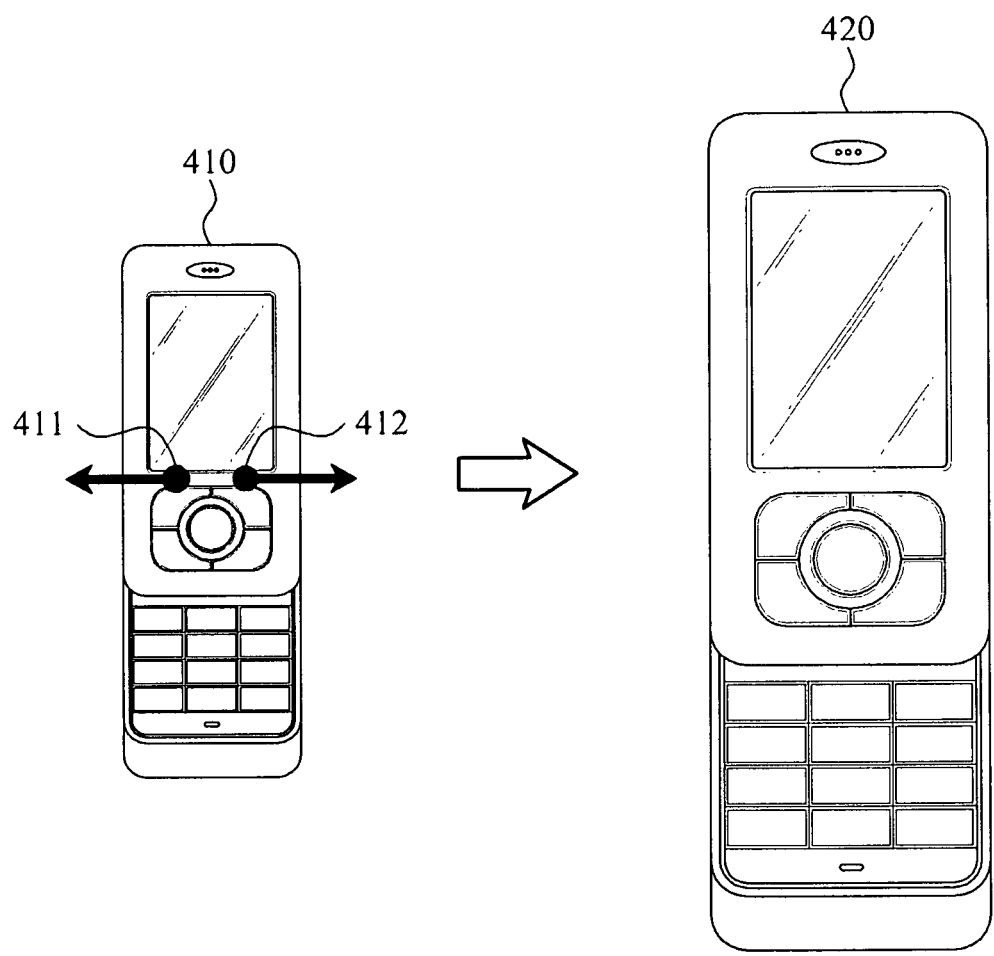
Figure 4C:
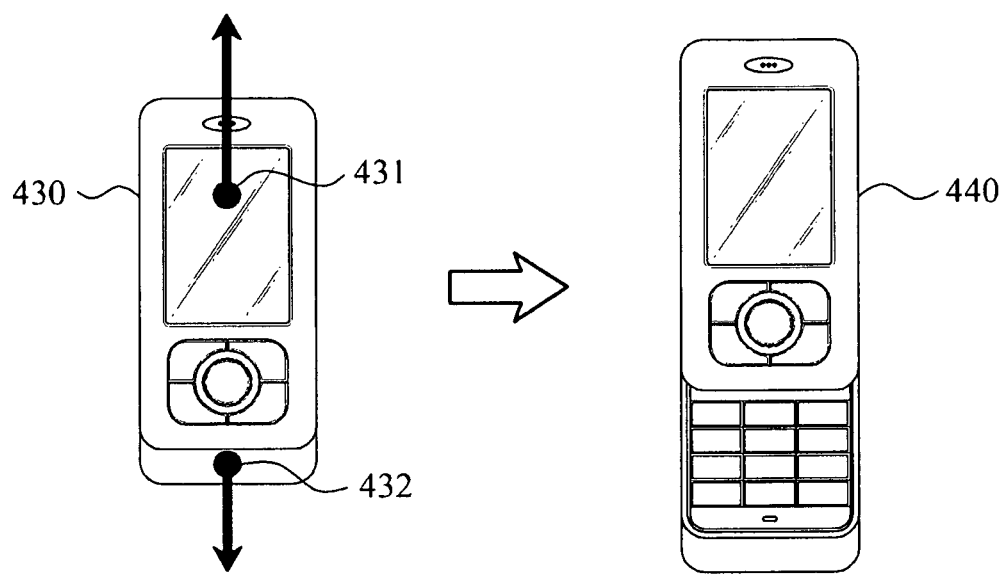

FIG. 4A through FIG. 4C illustrate an operation of an object controlling apparatus controlling a slide phone of a virtual world according to example embodiments.

Referring to 4A, a slide phone 400 of the virtual world may include, for example, a first subpart 401 and a second subpart 402.

The slide phone 400 may further include a third subpart through a fourteenth subpart. The third subpart through the fourteenth subpart may correspond to buttons of a button portion provided on a front portion of the second subpart 402. The buttons may include number buttons from zero to 9, a "#" button, and a "*" button.

Total transform information associated with a total transform of the slide phone 400 may include information associated with a transform of the slide phone 400 being enlarged.

Internal transform information associated with an internal transform of the slide phone 400 may include information regarding a transform whereby a button of the button portion of the second subpart 402 is pressed, and a transform whereby the first subpart 401 and the second subpart 402 translate such that the slide phone 400 slides to be opened and closed.

Internal transform information associated with an internal transform whereby a button 1 of the button portion is pressed may include information as given by Table 4.

TABLE 4

SubPart_id = 3.
Translation_center ($O_{xt}$, $O_{yt}$, $O_{zt}$) = subparti_id = center point of 3
Translation_vector = (0, 0, −1): −z axial direction as direction where button is pressed
Translation_base_subpart_id = 1
Translation_range = (0, 5)

Referring to Table 4, a subpart ID of the button 1 of the button portion may be "3".

Also, a translation center indicating a center point that is a translation standard of the button 1 being pressed may correspond to 3D pointing coordinates with respect to the center point of the button 1. The 3D pointing coordinates indicating the translation center with respect to the button 1 may correspond to a coordinate value expressed using a local coordinate system 403 with respect to the slide phone 400.

A translation vector indicating a translation distance and direction of the button 1 being pressed may be (0, 0, −1). For example, the pressed direction of the button 1 may correspond to a translation in a negative direction of a Z axis of the local coordinate system 403.

A translation base subpart ID indicating a standard subpart with respect to a transform of a third subpart, for example, the button 1 may be "1". For example, the button 1 may perform a transform whereby the button is pressed based on the first subpart 401.

A translation range indicating a minimum value and a maximum value of the pressed translation of the button 1 may have (0, 5). For example, the button 1 may be pressed in the negative direction of the Z axis of the local coordinates system 403 from a minimum of 0 to a maximum of 5.

Accordingly, when a pointing signal for a translation corresponding to '1' in the negative direction of the Z axis of the local coordinate system 403 based on a coordinate value corresponding to a center of the button 1 is received from an input device, the object controlling apparatus may control a transform of the slide phone 400 so that the button 1 of the slide phone 400 may be pressed in correspondence to the input pointing signal and object information associated with the slide phone 400.

Referring to FIG. 4B, total transform information associated with a slide phone 410 may include information associated with a transform of the slide phone 410 being enlarged. For example, the total transform information may include information associated with a transform of the slide phone 410 being enlarged to be slide phone 420.

When a pointing signal 411 for a translation in a negative direction of an X axis of the local coordinate system 403 and a pointing signal 412 for a translation in a positive direction of the X axis of the local coordinate system 403 are input with respect to the slide phone 410, the total transform information associated with the slide phone 410 may include information associated with the enlargement transform of the slide phone 410.

In this example, when the pointing signals 411 and 412, with respect to the slide phone 410, are input from the input device, the object controlling apparatus may enlarge the slide phone 410 based on the input pointing signals 411 and 412, and the total transform information associated with the slide phone 410.

Referring to FIG. 4C, internal transform information associated with a slide phone 430 may include information associated with a transform of the slide phone 430 sliding to be opened and closed. For example, the internal transform information associated with the slide phone 430 may include information associated with a transform of the slide phone 430 being transformed to be an open slide phone 440.

When a pointing signal 431 for a translation in a positive direction of an Y axis of the local coordinate system 403 and a pointing signal 432 for a translation in a negative direction of the Y axis of the local slide phone 403 are input with respect to the slide phone 430, the internal transform information associated with the slide phone 430 may include information associated with a transform of the slide phone 430 sliding to be opened.

The object controlling apparatus may control an operation of the slide phone 430 sliding to be opened and closed based on a pointing signal with respect to each of the first subpart 401 and the second subpart 402 of the slide phone 430.

Table 5 and Table 6 show internal transform information associated with the transform of the slide phone 430 sliding to be opened and closed. Table 5 shows internal transform information associated with the first subpart 401 in the internal transform information associated with the transform of the slide phone 430 sliding to be opened and closed.

TABLE 5

| Subpart_id = 1 | Children_subpart_ids = {3, 4, 5, 6, 7, 8, 9, 10, 11, 12, 13, 14} | | | |
|---|---|---|---|---|
| Translation_center = center point of (subpart_id = 1) | Translation_vectors = (0, −1, 0) | Translation_base_subpart_ids = 2 | Translation_range = (0, 20) |

Referring to Table 5, a subpart ID of the first subpart 401 may be "1". The first subpart 401 may include, as children subparts, a third subpart through a fourteenth subpart.

A translation center may correspond to 3D pointing coordinates with respect to a center point of the first subpart 401.

A translation vector may be (0, −1, 0). For example, in the operation of the slide phone 430 sliding to be opened, a translation direction of the first subpart 401 may correspond to the negative direction of the Y axis of the local coordinate system 403.

A translation base subpart ID may be "2". For example, a standard subpart with respect to a translation transform of the first subpart 401 may correspond to the second subpart 402.

A translation range may be (0, 20). For example, in the operation of the slide phone 430 sliding to be opened, the first subpart 401 may be translated in the negative direction of the Y axis of the local coordinate system 403 from a minimum of 0 to a maximum of 20.

Table 6 shows internal transform information associated with the second subpart 402 in the internal transform information associated with the transform of the slide phone 430 sliding to be opened and closed.

TABLE 6

| Subpart_id = 2 | | | |
|---|---|---|---|
| Translation_center = center point of (subpart_id = 2) | Translation_vectors = (0, 1, 0) | Translation_base_subpart_ids = 1 | Translation_range = (0, 20) |

Referring to Table 6, a subpart ID of the second subpart 402 may be "2".

A translation center may correspond to 3D pointing coordinates with respect to a center point of the second subpart 402.

A translation vector may be (0, 1, 0). For example, in the operation of the slide phone 430 sliding to be opened, a translation direction of the second subpart 402 may correspond to the positive direction of the Y axis of the local coordinate system 403.

A translation base subpart ID may be "1". For example, a standard subpart with respect to a translation transform of the second subpart 402 may correspond to the first subpart 401.

A translation range may be (0, 20). For example, in the operation of the slide phone 430 sliding to be opened, the second subpart 402 may be translated in the positive direction of the Y axis of the local coordinate system 403 from a minimum of 0 to a maximum of 20.

When the pointing signal 431 for the translation in the positive direction of the Y axis of the local coordinate system 403 and the pointing signal 432 for the translation in the negative direction of the Y axis of the local slide phone 403 with respect to the slide phone 430 are input from the input device, the object controlling apparatus may slide the slide phone 430 to be opened based on the input pointing signals 431 and 432, and internal transform information associated with the slide phone 430.

Figure 5A:
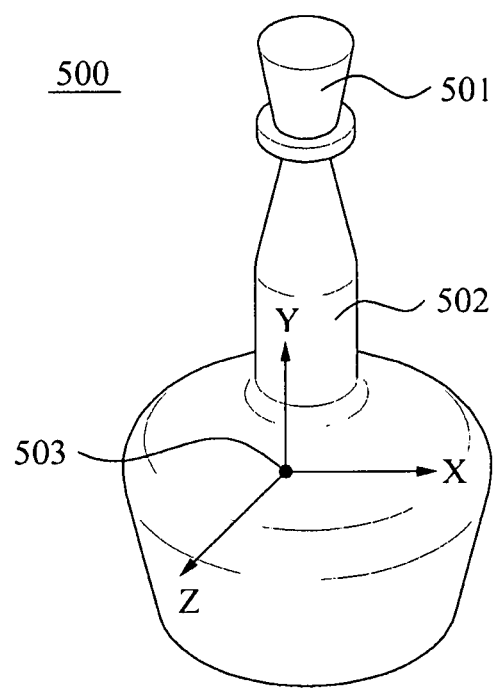
FIG. 5A through FIG. 5C illustrate an operation of an object controlling apparatus controlling a bottle of a virtual world according to example embodiments.
Figure 5B:
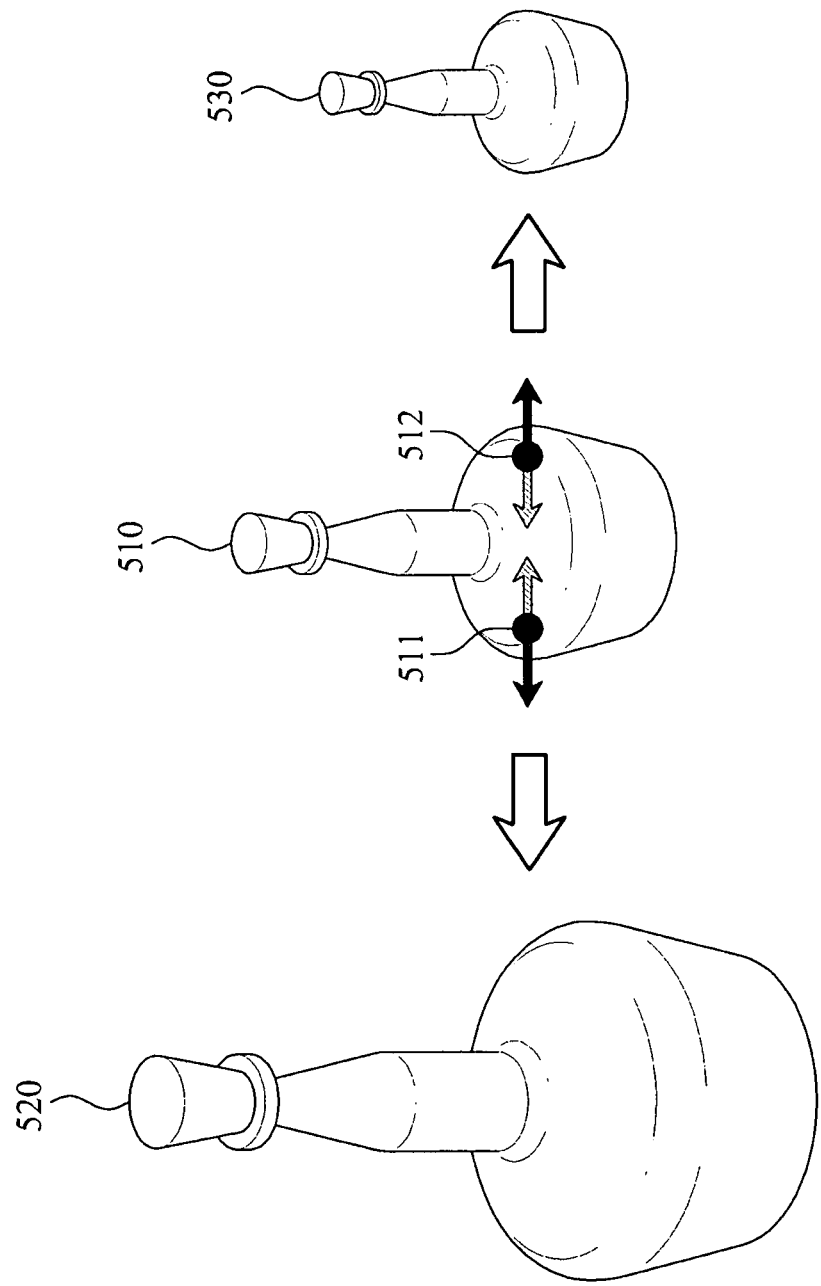
Figure 5C:
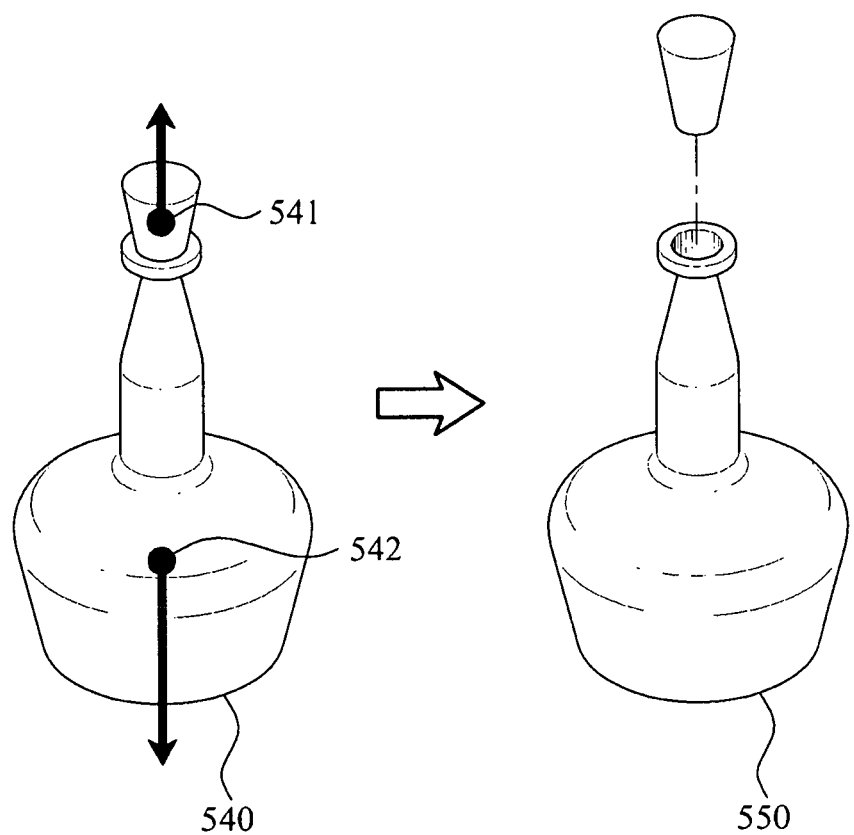

FIG. 5A through FIG. 5C illustrate an operation of an object controlling apparatus controlling a bottle of a virtual world according to example embodiments.

Referring to FIG. 5A, a bottle 500 of a virtual world may include a first subpart 501 corresponding to a bottle cap and a second subpart 502 corresponding to a body of the bottle 500.

Internal transform information associated with an internal transform of the bottle 500 may include information associated with a transform of the first subpart 501 and the second subpart 502 being separated from each other.

Total transform information associated with a total transform of the bottle 500 may include information associated with a transform of the bottle 500 being enlarged or reduced.

Referring to FIG. 5B, total transform information associated with a bottle 510 may include information associated with an enlargement and reduction transform of the bottle 510. For example, the total transform information associated with the bottle 510 may include information associated with a transform of the bottle 510 being enlarged to be a bottle 520 or a transform of the bottle 510 being reduced to be a bottle 530.

When a pointing signal 511 corresponding to a black arrow indicator for a translation in a negative direction of an X axis of a local coordinate system 503 and a pointing signal 512 corresponding to a black arrow indicator for a translation in a positive direction of the X axis of the local coordinate system 503 are input with respect to the bottle 510, total transform information associated with the bottle 510 may include information associated with the enlargement transform of the bottle 510.

In this example, when the pointing signals 511 and 512, corresponding to the black arrow indicators with respect to the bottle 500, are input from an input device, the object controlling apparatus may enlarge the bottle 510 based on the input pointing signals 511 and 512 and total transform information associated with the bottle 510.

When the pointing signal 511 corresponding to a shaded arrow indicator for the translation in the positive direction of the X axis of the local coordinate system 503 and the pointing signal 512 corresponding to a shaded arrow indicator for a translation in the negative direction of the X axis of the local coordinate system 503 are input with respect to the bottle 510, the total transform information associated with the bottle 510 may include information associated with the reduction transform of the bottle 510.

In this example, when the pointing signals 511 and 512, corresponding to the shaded arrow indicators with respect to the bottle 510, are input from the input device, the object controlling apparatus may reduce the bottle 510 based on the input pointing signals 511 and 512, and total transform information associated with the bottle 510.

Referring to FIG. 5C, internal transform information associated with a bottle 540 may include information associated with a transform whereby a bottle cap of the bottle 540 is separated from the bottle 540. For example, the internal transform information associated with the bottle 540 may include information associated with a transform whereby the bottle cap of the bottle 540 is separated and thus the bottle 540 is transformed to be a bottle 550.

When a pointing signal 541 for a translation in a positive direction of an Y axis of the local coordinate system 503 and a pointing signal 542 for a translation in a negative direction of the Y axis of the local coordinate system 503 are input with respect to the bottle 540, the internal transform information associated with the bottle 540 may include information associated with the transform whereby the bottle cap of the bottle 540 is separated.

The object controlling apparatus may control an operation of separating the bottle cap of the bottle 510 based on a pointing signal with respect to each of the first subpart 501 and the second subpart 502 of the bottle 540.

Table 7 and Table 8 shown internal transform information associated with the transform whereby the bottle cap of the bottle 540 is separated. Table 7 shows internal transform information associated with the first subpart 501 in the internal transform information associated with the transform whereby the bottle cap of the bottle 540 is separated.

TABLE 7

| Subpart_id = 1 | | | |
|---|---|---|---|
| Translation_center = center point of (subpart_id = 1) | Translation_vectors = (0, 1, 0) | Translation_base_subpart_ids = 2 | Translation_range = (−5, ∞) |

Referring to Table 7, a subpart ID of the first subpart 501 may be "1".

A translation center may correspond to 3D pointing coordinates with respect to a center point of the first subpart 501.

A translation vector may be (0, 1, 0). For example, in the operation of separating the bottle cap of the bottle 540, a translation direction of the first subpart 501 may correspond to the positive direction of the Y axis of the local coordinate system 503.

A translation base subpart ID may be "2". For example, a standard subpart with respect to a translation transform of the first subpart 501 may correspond to the second subpart 502.

A translation range may be (−5, ∞). For example, in the operation of separating the bottle cap of the bottle 540, the first subpart 501 may be translated in the positive direction of the Y axis of the local coordinate system 503 from a minimum of −5 to a maximum of ∞.

Table 8 shows internal transform information associated with the second subpart 502 in the internal transform information associated with the transform of separating the bottle cap of the bottle 540.

TABLE 8

| Subpart_id = 2 | | | |
|---|---|---|---|
| Translation_center = center point of (subpart_id = 2) | Translation_vectors = (0, −1, 0) | Translation_base_subpart_ids = 1 | Translation_range = (0, 20) |

Referring to Table 8, a subpart ID of the second subpart 502 may be "2".

A translation center may correspond to 3D pointing coordinates with respect to a center point of the second subpart 502.

A translation vector may be (0, −1, 0). For example, in the operation of separating the bottle cap of the bottle 540, a translation direction of the second subpart 502 may correspond to the negative direction of the Y axis of the local coordinate system 503.

A translation base subpart ID may be "1". For example, a standard subpart with respect to a translation transform of the second subpart 502 may correspond to the first subpart 501.

A translation range may be (0, 20). For example, in the operation of separating the bottle cap of the bottle 540, the second subpart 502 may be translated in the negative direction of the Y axis of the local coordinate system 503 from a minimum of 0 to a maximum of 20.

When the pointing signal 541 for the translation in the positive direction of the Y axis of the local coordinate system 503 and the pointing signal 542 for the translation in the negative direction of the Y axis of the local coordinate system 503 with respect to the bottle 540 are input from the input device, the object controlling apparatus may separate the bottle cap from the bottle 540.

Figure 6A:
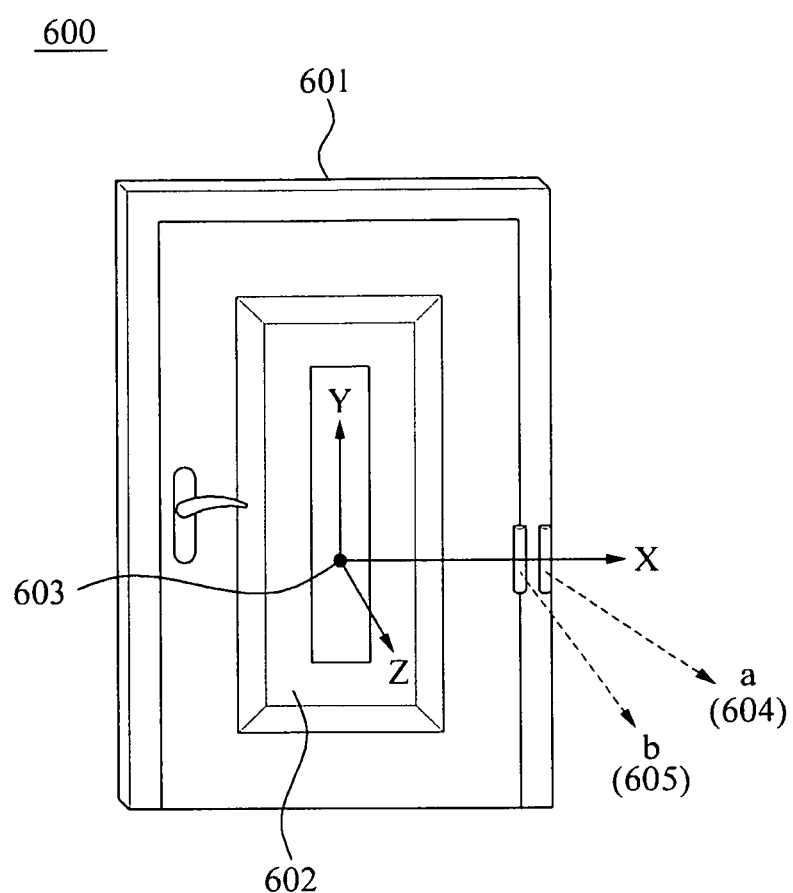
FIG. 6A through FIG. 6C illustrate an operation of an object controlling apparatus controlling a door of a virtual world according to example embodiments.
Figure 6B:
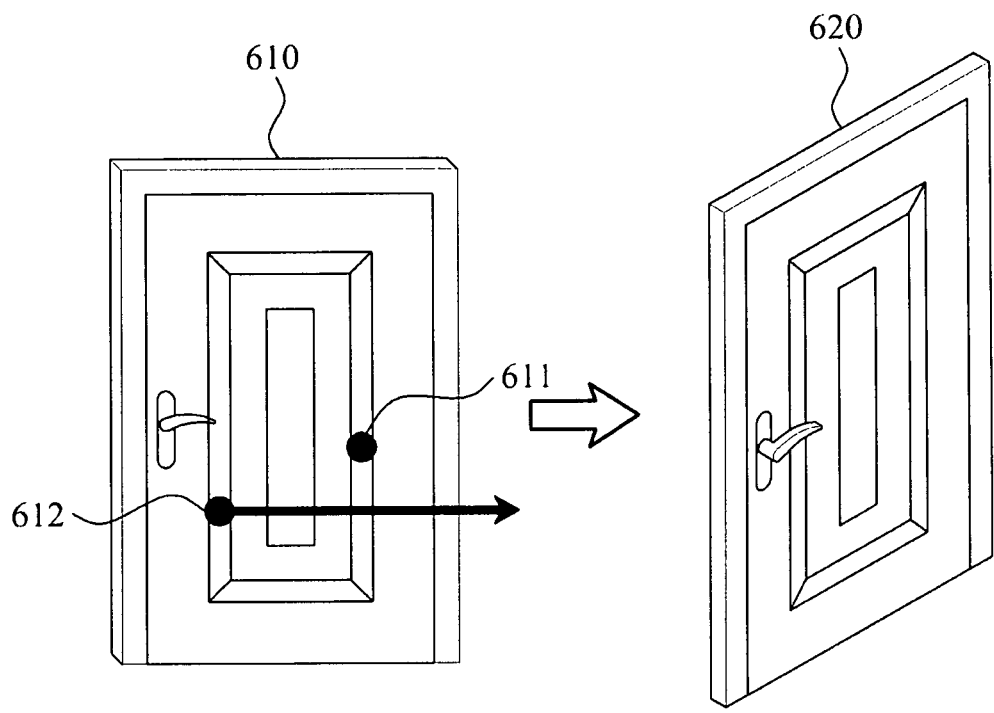
Figure 6C:
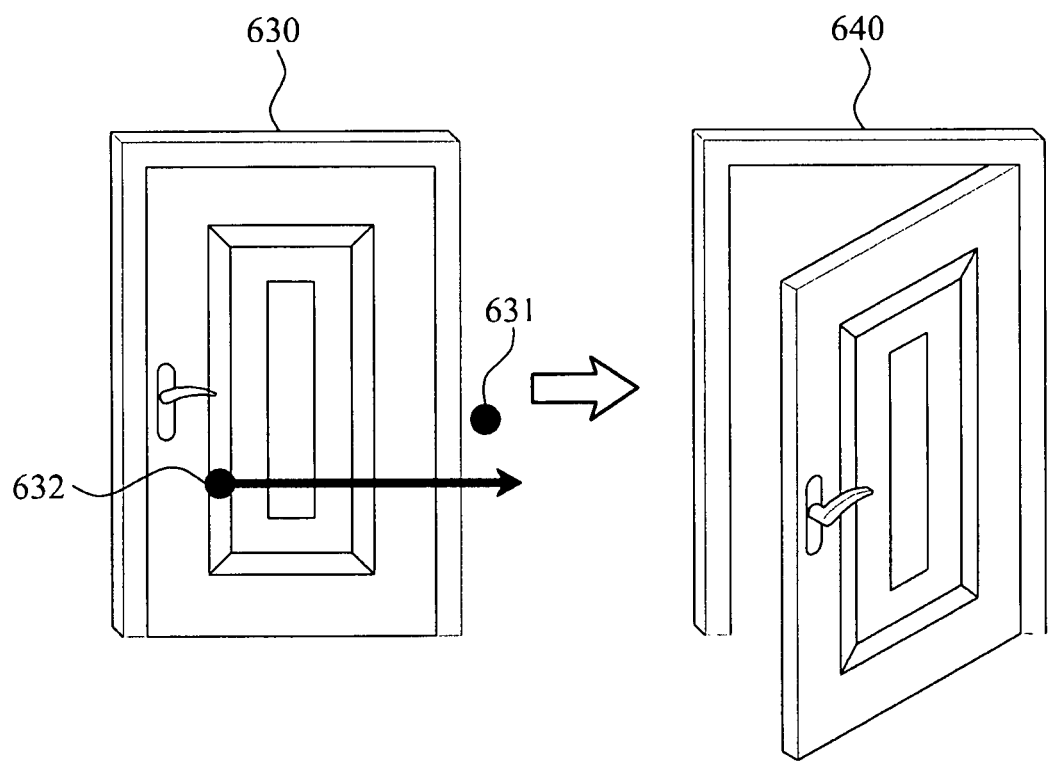

FIG. 6A through FIG. 6C illustrate an operation of an object controlling apparatus controlling a door of a virtual world according to example embodiments.

Referring to FIG. 6A, a door 600 of a virtual world may include a first subpart 601 and a second subpart 602.

Internal transform information associated with an internal transform of the door 600 may include information associated with a transform of the second subpart 602 rotating, for example, pivoting to be opened based on an axis b 605 provided between the first subpart 601 and the second subpart 602.

Total transform information associated with a total transform of the door 600 may include information associated with a transform of the door 600 rotating based on an axis a 604.

Referring to FIG. 6B, total transform information associated with a door 610 may include information associated with a transform of the door 610 rotating based on the axis a 604. For example, the total transform information associated with the door 610 may include information associated with a transform of the door 610 rotating to be a door 620.

When a pointing signal 611 for holding a predetermined portion of the second subpart 602 and a pointing signal 612 for a translation in a positive direction of an X axis of a local coordinate system 603 with respect to the door 610 are input with respect to the door 610, the total transform information associated with the door 610 may include information associated with the transform of the door 610 rotating based on the axis a 604.

In this example, when the pointing signals 611 and 612, with respect to the door 610, are input from an input device, the object controlling apparatus may rotate the door 610 based on the axis a 604, using the input pointing signals 611 and 612 and the total transform information associated with the door 610.

Referring to FIG. 6C, internal transform information associated with a door 630 may include information associated with a transform of the door 630 rotating based on the axis 605 to be opened. For example, the internal transform information associated with the door 630 may include information associated with the transform of the door 630 rotating to be an opened door 640.

When a pointing signal 631 for holding a predetermined portion of the first subpart 601 and a pointing signal 632 for a translation in the positive direction of the X axis of the local coordinate system 603 are input with respect to the door 630, the internal transform information associated with the door 630 may include information associated with the transform of the door 630 rotating to be opened.

Table 9 shows internal transform information associated with the transform of the door 630 rotating to be opened.

TABLE 9

| Subpart_id = 2 | Children_subpart_ids = {1} | | |
|---|---|---|---|
| Rotation_center = (b, 0, 0) | Rotation_vectors = (0, 0, 1) | Rotation_base_subpart_ids = 1 | Rotation_range = (0, 90) |

Referring to Table 9, a subpart ID of the second subpart 602 may be "2". The second subpart 602 may include the first subpart 601 as a children subpart.

A rotation center may be (b, 0, 0). For example, the second subpart 602 may rotate based on an axis where a value of the X axis of the local coordinate system 603 is b and a value of each of an Y axis and a Z axis is 0, that is, based on the axis b 605 where x=b.

A rotation vector may be (0, 0, 1). For example, in the operation of the door 630 rotating to be opened, a translation direction of the second subpart 602 may correspond to a positive direction of the Z axis of the local coordinate system 603.

A rotation base subpart ID may be "1". For example, a standard subpart with respect to a rotation transform of the second subpart 602 may correspond to the first subpart 601.

A rotation range may be (0, 90). For example, in the operation of the door 630 rotating to be opened, the second subpart 602 may be translated in the positive direction of the Z axis from minimum zero degree to a maximum of 90 degrees.

When the pointing signal 631 for holding the predetermined portion of the first subpart 601 and the pointing signal 632 for the translation in the positive direction of the X axis of the local coordinate system 603 with respect to the door 630 are input from an input device, the object controlling apparatus may rotate the door 630 based on the axis b 605.

FIG. 7A through FIG. 7E illustrate an operation of an object controlling apparatus controlling a spring of a virtual world according to example embodiments.

Figure 7A:
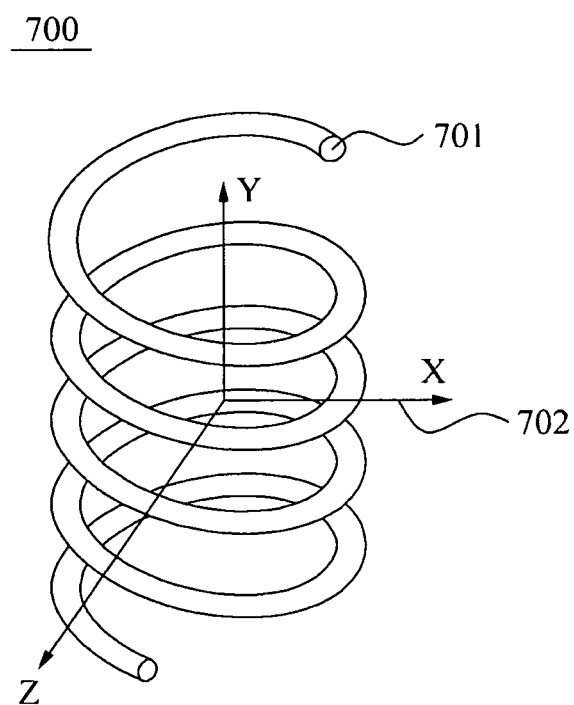
FIG. 7A through FIG. 7E illustrate an operation of an object controlling apparatus controlling a spring of a virtual world according to example embodiments.

Referring to FIG. 7A, a spring 700 of a virtual world may include a first subpart 701. For example, the spring 700 may include only a single subpart 701.

Internal transform information associated with an internal transform of the spring 700 may include information associated with a transform of the first subpart 701 being compressed or expanded.

Total transform information associated with a total transform of the spring 700 may include information associated with a transform of the first subpart 701 being scaled up or down, that is, enlarged or reduced.

Figure 7B:
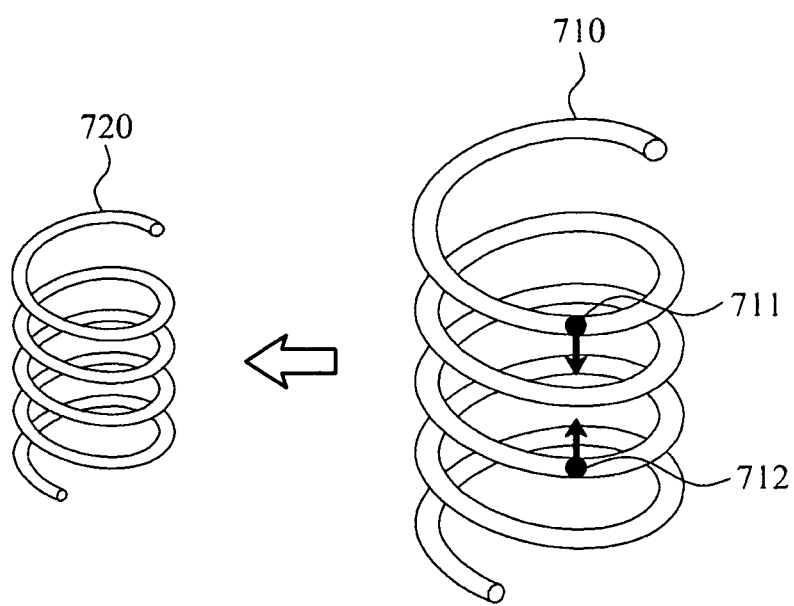

Referring to FIG. 7B, total transform information associated with a spring 710 may include information associated with a transform of the spring 710 being scaled down, that is, reduced. For example, total transform information associated with the spring 710 may include information associated with the transform of the spring 710 reduced to be a spring 720.

When a pointing signal 711 having a predetermined value of a Z axis of a local coordinate system 702 with respect to the spring 710 and for a translation in a negative direction of a Y axis, and a pointing signal 712 having the same value of the Z axis as the value of the Z axis of the pointing signal 711 and for a translation in a positive direction of the Y axis are input, total transform information associated with the transform 710 may include information associated with a reduction transform of the spring 710.

In this example, when the pointing signals 711 and 712 with respect to the spring 710 are input from an input device, the object controlling apparatus may reduce the spring 710 based on the input pointing signals 711 and 712, and total transform information associated with the spring 710.

Figure 7C:
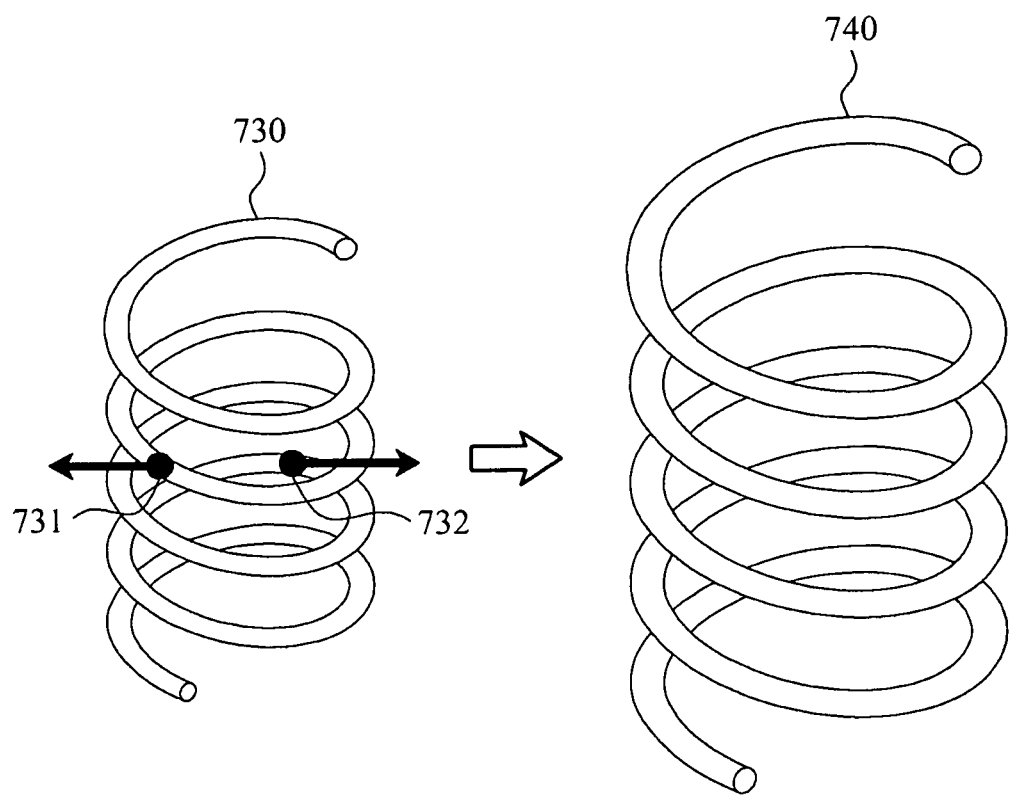

Referring to FIG. 7C, total transform information associated with a spring 730 may include information associated with a transform of the spring 730 being enlarged, that is, scaled up. For example, the total transform information associated with the spring 730 may include information associated with a transform of the spring 730 being enlarged to be a spring 740.

When a pointing signal 731 having a predetermined value of the Z axis of the local coordinate system 702 with respect to the spring 730 and for a translation in a negative direction of an X axis, and a pointing signal 732 having a value of the Z axis different from the value of the Z axis of the pointing signal 731 in the local coordinate value 702 and for a translation in a positive direction of the X axis are input with respect to the spring 730, total transform information associated with the spring 730 may include information associated with an enlargement transform of the spring 730.

In this example, when the input signals 731 and 732 with respect to the spring 730 are input from an input device, the object controlling apparatus may enlarge the spring 730 based on the input pointing signals 731 and 732, and total transform information associated with the spring 730.

Figure 7D:
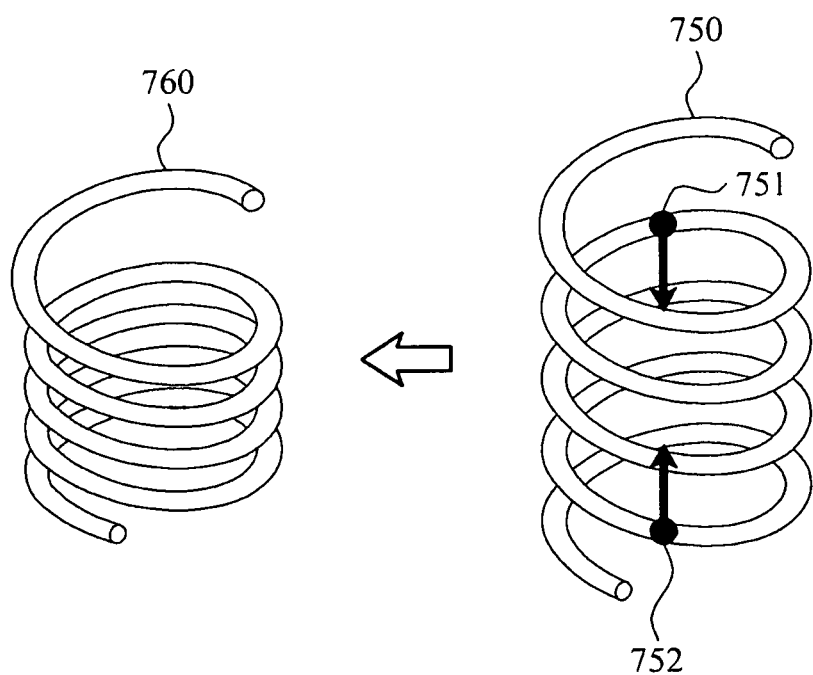

Referring to FIG. 7D, internal transform information associated with a spring 750 may include information associated with a transform of the spring 750 being compressed. For example, the internal transform information associated with the spring 750 may include information associated with a transform of the spring being compressed to be a spring 760.

When a pointing signal 751 having a predetermined value of a Z axis of the local coordinate system 702 with respect to the spring 750 and for a translation in the negative direction of the Y axis, and a pointing signal 752 having a value of the Z axis different from the value of the Z axis of the pointing signal 751 and for a translation in the positive direction of the Y axis of the local coordinate system 702 are input, internal transform information associated with the spring 750 may include information associated with a transform of the spring 750 being compressed.

The object controlling apparatus may control an operation of the spring 750 being compressed based on a pointing signal with respect to the first subpart 701 of the spring 750.

Table 10 shows internal transform information associated with the transform of the spring 750 being compressed.

TABLE 10

| Subpart_id = 1 | | | |
|---|---|---|---|
| Scaling_center = (0, 0, 0) | Scaling_vectors = (0, 1, 0) | Scaling_base_subpart_ids = none | Scaling_range = (−40, 40) |

Referring to Table 10, a subpart ID of the first subpart 701 may be "1".

A scaling center may be (0, 0, 0). For example, the first subpart 701 may be compressed based on an origin of the local coordinate system 702.

A scaling vector may be (0, 1, 0). For example, in the operation of compressing the spring 750, a translation direction of the first subpart 701 may correspond to the positive direction of the Y axis of the local coordinate system 702.

A scaling base subpart ID may be none. For example, since the spring 750 includes only a single subpart, no standard subpart is provided for the transform of the first subpart 701 being compressed.

A scaling range may be (−40, 40). For example, in the operation of compressing the spring 750, the first subpart 701 may be compressed in the positive direction of the Y axis of the local coordinate system 702 from a minimum of −40 to a maximum of 40.

When a pointing signal 751 having a predetermined value of the Z axis of the local coordinate system 702 with respect to the spring 750 and for a translation in the negative direction of the Y axis, and a pointing signal 752 having a value of the Z axis different from the value of the Z axis of the pointing signal 751 and for a translation in the positive direction of the Y axis of the local coordinate system 702 are input from an input device, the object controlling apparatus may compress the spring 750 based on the input pointing signals 751 and 752, and internal transform information associated with the spring 750.

Figure 7E:
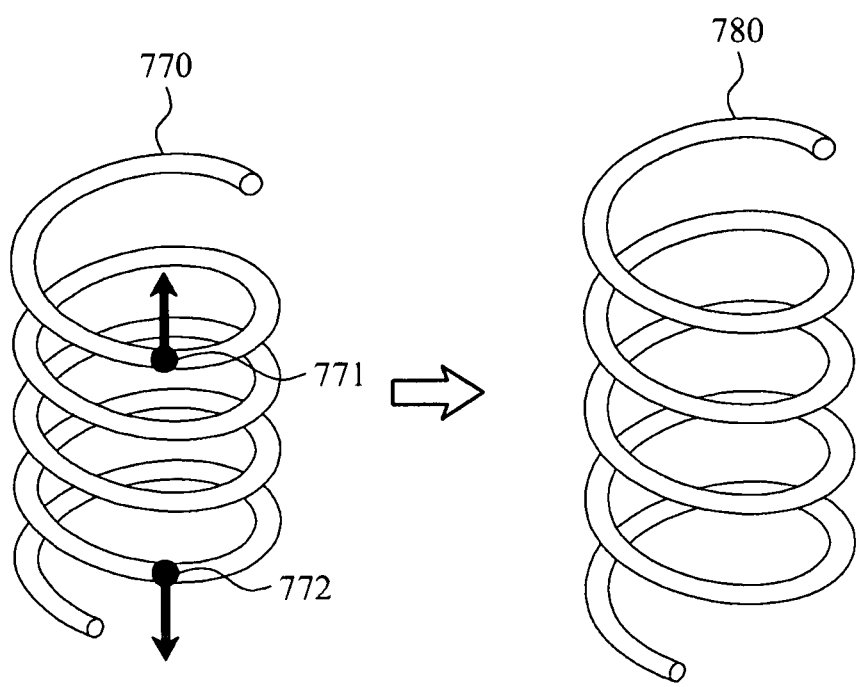

Referring to FIG. 7E, internal transform information associated with a spring 770 may include information associated with a transform of the spring 770 being expanded. For example, the internal transform information associated with the spring 770 may include information associated with the transform of the spring 770 being expanded to be a spring 780.

When a pointing signal 771 having a predetermined value of the Z axis of the local coordinate system 702 with respect to the spring 770 and for a translation in the positive direction of the Y axis, and a pointing signal 772 having the same value of the Z axis as the value of the Z axis of the pointing signal 771 and for a translation in the negative direction of the Y axis of the local coordinate system 702 are input, internal transform information associated with the spring 770 may include information associated with the transform of the spring 770 being expanded.

In this example, when the pointing signals 771 and 772 with respect to the spring 770 are input from an input device, the object controlling apparatus may expand the spring 770 based on the input pointing signals 771 and 772, and internal transform information associated with the spring 770.

Figure 8A:
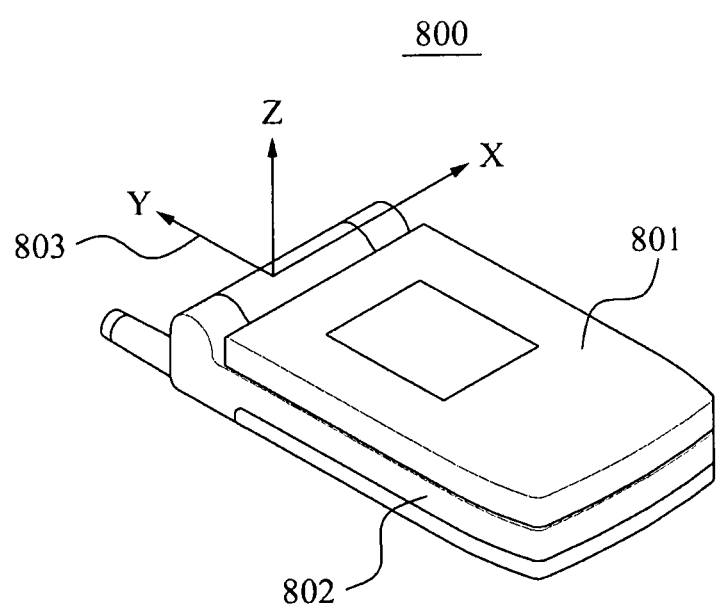

FIG. 8A and FIG. 8B illustrate an operation of an object controlling apparatus controlling a folder phone of a virtual world according to example embodiments.

Referring to FIG. 8A, a folder phone 800 of a virtual world may include a first subpart 801 corresponding to a top folder of the folder phone 800 and a second subpart 802 corresponding to a bottom folder of the folder phone 800.

Internal transform information associated with an internal transform of the folder phone 800 may include information associated with a transform of the folder phone 800 being opened.

Table 11 shows internal transform information associated with the transform of the folder phone 800 being opened.

TABLE 11

| Subpart_id = 1 | | | |
|---|---|---|---|
| Rotation_center = (0, 0, 0) | Rotation_vectors = (1, 0, 0) | Rotation_base_subpart_ids = 2 | Rotation_range = (0, 70) |
| Subpart_id = 2 | | | |
| Rotation_center = (0, 0, 0) | Rotation_vectors = (1, 0, 0) | Rotation_base_subpart_ids = 1 | Rotation_range = (0, 70) |

Referring to Table 11, a subpart ID of the first subpart 801 may be "1".

A rotation center may be (0, 0, 0). For example, the first subpart 801 may rotate based on an origin of a local coordinate system 803.

A rotation vector may be (1, 0, 0). For example, in the operation of opening the folder phone 800, a translation direction of the first subpart 801 may correspond to a positive direction of an X axis of the local coordinate system 803.

A rotation base subpart ID may be "2". For example, a standard subpart with respect to a rotation transform of the first subpart 801 may correspond to the second subpart 802.

A rotation range may be (0, 70). For example, in the operation of opening the folder phone 800, the first subpart 801 may be translated from minimum zero degree to maximum 70 degrees.

A subpart ID of the second subpart 802 may be "2".

A rotation center may be (0, 0, 0). For example, the second subpart 802 may rotate based on an origin of the local coordinate system 803.

A rotation vector may be (1, 0, 0). For example, in the operation of opening the folder phone 800, a translation direction of the second subpart 802 may correspond to the positive direction of the X axis of the local coordinate system 803.

A rotation base subpart ID may be "1". For example, a standard subpart with respect to a rotation transform of the second subpart 802 may correspond to the first subpart 801.

A rotation range may be (0, 70). For example, in the operation of opening the folder phone 800, the second subpart 802 may be translated from minimum zero degree to maximum 70 degrees.

Referring to FIG. 8B, internal transform information associated with a folder phone 810 may include information associated with a transform of the folder phone 810 being opened. For example, the internal transform information associated with the folder phone 810 may include information associated with the transform of the folder phone 810 being transformed to be an opened folder 820.

A plurality of pointing signals 811, 812, 813, 814, 815, and 816 may be input with respect to the folder phone 810.

The object controlling apparatus may determine whether a valid input signal is present among a plurality of pointing signals input from an input device.

For example, a combination of the pointing signals 811 and 812 among the plurality of pointing signals 811, 812, 813, 814, 815, and 816 may correspond to the valid input signal. In this example, the object controlling apparatus may determine, as the valid input signal with respect to the folder phone 810, the combination of the pointing signal 811 having a predetermined value of an Y axis of a local coordinate system 803 with respect to the folder phone 810 and for a translation in a negative direction of a Z axis, and the pointing signal 812 having a value of the Y axis different from the value of the Y axis of the pointing signal 811 and for a translation in the negative direction of the Z axis. The object controlling apparatus may control the folder phone 810 to be opened based on the pointing signals 811 and 812 that are determined as valid input signals, and the internal transform information associated with the folder phone 810.

Figure 9:
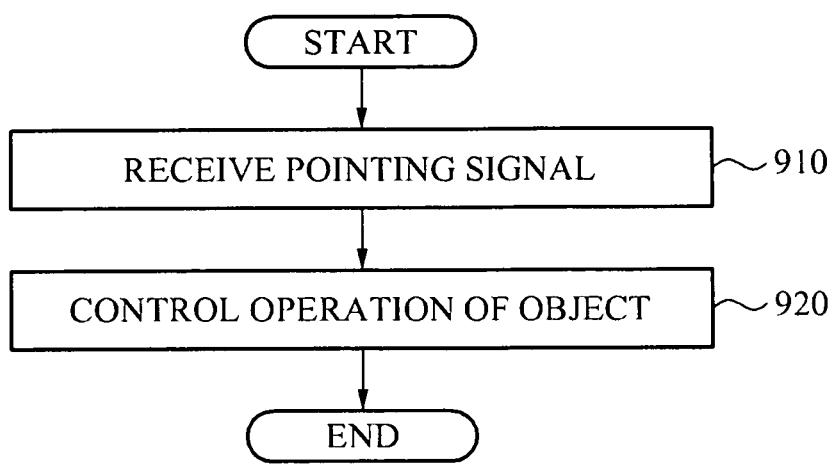
FIG. 9 illustrates an object controlling method according to example embodiments.

FIG. 9 illustrates an object controlling method according to example embodiments.

Referring to FIG. 9, in operation 910, a pointing signal for manipulating an object of a virtual world may be received from an input device. Depending on example embodiments, a plurality of pointing signals may be received.

The pointing signal may correspond to a coordinate value using 3D pointing coordinates. The object of a virtual world may have a local coordinate system. The pointing signal may be a coordinate value expressed using a local coordinate system of the object.

The object may include at least one subpart. Object information may include at least one of identification information used to identify the at least one subpart, and transform information associated with a transform of the at least one subpart.

The transform information may include at least one of translation information associated with a translation of the at least one subpart, rotation information associated with a rotation of the at least one subpart, and scaling information associated with scaling of the at least one subpart.

In operation 920, at least one of an operation, a state, and a shape of the object may be controlled based on the pointing signal and object information associated with the object that is stored in a database.

Figure 10:
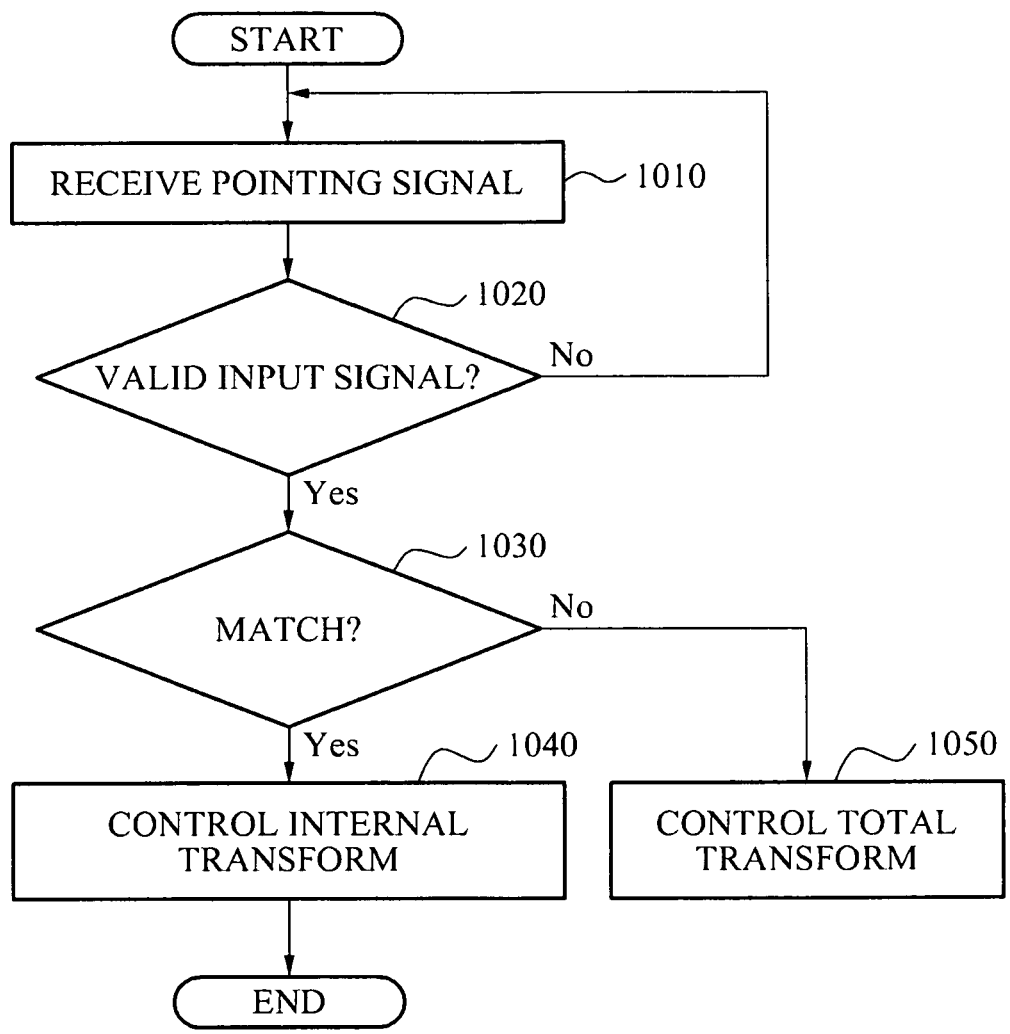
FIG. 10 illustrates an object controlling method according to other example embodiments.

FIG. 10 illustrates an object controlling method according to other example embodiments.

Referring to FIG. 10, in operation 1010, a pointing signal may be received from an input device. Depending on example embodiments, a plurality of pointing signals may be received.

In operation 1020, whether the input pointing signal corresponds to a valid input signal may be determined.

Depending on example embodiments, whether the input pointing signal corresponds to a valid input signal may be determined depending on whether the input pointing signal matches one of a pointing signal for an internal transform of the object and a pointing signal for a total transform of the object that are stored in a database. For example, when the input pointing signal matches one of the pointing signals stored in the database, the object controlling method may determine the input pointing signal as a valid input signal.

The database may include internal transform information associated with the internal transform of the object of the virtual world and total transform information associated with the total transform of the object. The internal transform information may include the pointing signal for the internal transform of the object. The total transform information may include the pointing signal for the total transform of the object.

The object of the virtual world may include at least one subpart. The internal transform information may include at least one of identification information used to identify the at least one subpart, translation information associated with a translation of the at least one subpart, rotation information associated with a rotation of the at least one subpart, and scaling information associated with scaling of the at least one subpart.

The internal transform may indicate a unique transform of the object set for each object. The total transform indicates a transform set to be commonly applied to all the object(s) in the virtual world. For example, the total transform may indicate an enlargement, a reduction, a rotation, and the like of the object(s). In the case of a slide phone, the internal transform may indicate a transform of the slide phone sliding to be opened, a transform of the slide phone sliding to be closed, a transform whereby a button of the slide phone is pressed, and the like.

The internal transform information may include a pointing signal for the internal transform of the object. A pointing signal for the internal transform of the object may be set to be different for each object. The total transform information may include a pointing signal for the total transform of the object. A pointing signal for the total transform of the object may be set to be different for each object.

A user may change internal transform information of the object. For example, the user may update the internal transform information by storing the received internal transform information in the database.

The user may change total transform information of the object. For example, the user may set total transform information of the object(s). The object controlling method may update the total transform information of the object(s) by storing the received total transform information in the database.

When the input pointing signal is determined to not be the valid input signal, the object controlling method may return to operation 1010 of receiving the pointing signal from the input device without controlling the operation of the object and the like.

Conversely, when the input pointing signal is determined to be the valid input signal, whether the input pointing signal matches the internal transform information may be determined in operation 1030.

When the input pointing signal matches the pointing signal for the internal transform of the object that is included in the internal transform information stored in the database, the input pointing signal may be determined to match the internal transform information.

When the input pointing signal is determined to match the internal transform information, the internal transform of the object may be controlled based on the internal transform information in operation 1040.

Conversely, when the input pointing signal is determined to not match the internal transform information, the total transform of the object may be controlled based on the total transform information in operation 1050.

The object controlling method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules or units described herein may be executed by a dedicated processor unique to that unit or by a processor common to one or more of the modules. The described methods may be executed on a general purpose computer or processor or may be executed on a particular machine such as described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An object controlling apparatus, comprising:
   an input unit to receive, from an input device, a pointing signal for manipulating an object of a virtual world;
   a database to store object information associated with the object including a transform of the object;
   a decision unit to determine that the received pointing signal is a valid signal when the received pointing signal matches the transform of the object stored in the database and to determine that the received pointing signal is an invalid signal when the received pointing signal does not match the transform of the object; and
   a controller to control at least one of an operation, a state, and a shape of the object based on the received pointing signal and the object information when the decision unit determines that the received pointing signal matches the transform of the object stored in the database and otherwise to not control the operation, the state, or the shape of the object based on the received pointing signal when the decision unit determines that the received pointing signal is the invalid signal.

2. The apparatus of claim 1, wherein:
   the object comprises at least one subpart, and
   the object information comprises at least one of identification information used to identify the at least one subpart, and transform information associated with a transform of the at least one subpart.

3. The apparatus of claim 2, wherein the transform information comprises at least one of translation information associated with a translation of the at least one subpart, rotation information associated with a rotation of the at least one subpart, and scaling information associated with scaling of the at least one subpart.

4. An object controlling apparatus for controlling an object of a virtual world, comprising:
   an input unit to receive a pointing signal for manipulating the object from an input device;
   a database to store internal transform information associated with an internal transform of the object and total transform information associated with a total transform of the object;
   a first decision unit to determine whether the pointing signal corresponds to a valid input signal;
   a second decision unit to determine whether the pointing signal matches the internal transform information, when the pointing signal corresponds to the valid input signal; and
   a controller to control the internal transform of the object based on the internal transform information when the pointing signal matches the internal transform information, and to control the total transform of the object based on the total transform information when the pointing signal does not match the internal transform information.

5. The apparatus of claim 4, wherein:
   the object comprises at least one subpart, and
   the internal transform information comprises at least one of identification information used to identify the at least one subpart, translation information associated with a translation of the at least one subpart, rotation information associated with a rotation of the at least one subpart, and scaling information associated with scaling of the at least one subpart.

6. An object controlling method comprising:
   receiving, from an input device, a pointing signal for manipulating an object of a virtual world, wherein the received pointing signal includes at least one of a first pointing signal for internally transforming the object and a second pointing signal for totally transforming the object;
   determining that the received pointing signal is a valid signal when the received pointing signal matches one of a pointing signal for an internal transform of the object stored in the database and a pointing signal for a total transform of the object stored in the database;
   determining that the received pointing signal is an invalid signal when the received pointing signal does not match one of the pointing signal for the internal transform of the object stored in the database and the pointing signal for the total transform of the object stored in the database; and
   controlling at least one of an operation, a state, and a shape of the object based on the received pointing signal and the object information when the received pointing signal is determined as the valid signal and otherwise to not control the operation, the state, or the shape of the object based on the received pointing signal when the received pointing signal is determined as the invalid signal.

7. The method of claim 6, wherein:
   the object comprises at least one subpart, and
   the object information comprises at least one of identification information used to identify the at least one subpart, and transform information associated with a transform of the at least one subpart.

8. A non-transitory computer-readable medium comprising a program for instructing a computer to perform the method of claim 6.

9. An object controlling method of controlling an object of a virtual world, comprising:
   receiving, from an input device, a pointing signal for manipulating the object;
   determining whether the pointing signal corresponds to a valid input signal;
   determining whether the pointing signal matches internal transform information associated with an internal transform of the object stored in a database, when the pointing signal corresponds to the valid input signal; and
   controlling, by way of a processor, the internal transform of the object based on the internal transform information when the pointing signal matches the internal transform information, and controlling a total transform of the object stored in the database when the pointing signal does not match the internal transform information.

10. A non-transitory computer-readable medium comprising a program for instructing a computer to perform the method of claim 9.

11. A method comprising:
    obtaining a plurality of pointing signals;
    obtaining internal transform information of at least one subpart of a virtual object;
    determining whether the plurality of pointing signals match the internal transform information of the at least one subpart of the virtual object; and
    controlling an internal transform of the virtual object when the plurality of pointing signals match the internal transform information of the at least one subpart of the virtual object.

12. The method of claim 11, wherein:
    the plurality of pointing signals include a first pointing signal and a second pointing signal,
    the at least one subpart of the virtual object include a first subpart and a second subpart, and
    the determining comprises
    matching the first pointing signal against internal transform information of the first subpart; and
    matching the second pointing signal against internal transform information of the second subpart.

13. The method of claim 12, wherein:
    the matching the first pointing signal comprises
    matching a vector of the first pointing signal against a vector included in the internal transform information of the first subpart, and
    the matching the second pointing signal comprises
    matching a vector of the second pointing signal against a vector included in the internal transform information of the second subpart.

14. The method of claim 11, wherein:
    the plurality of pointing signals include a first pointing signal and a second pointing signal,
    the at least one subpart of the virtual object include a first subpart, and
    the determining comprises
    matching the first pointing signal against internal transform information of the first subpart; and
    matching the second pointing signal against the internal transform information of the first subpart.

15. The method of claim 14, wherein:
    the matching the first pointing signal comprises
    matching a vector of the first pointing signal against a vector included in the internal transform information of the first subpart, and the matching the second pointing signal comprises
matching a vector of the second pointing signal against the vector included in the internal transform information of the first subpart.

16. The method of claim 11, wherein:
the internal information of the at least one subpart comprises at least one of position information, orientation information, and scale factor information.

17. The method of claim 11, further comprising:
controlling a total transform of the virtual object when the plurality of pointing signals do not match the internal transform information of the at least one subpart of the virtual object.

18. A non-transitory computer-readable medium comprising a program for instructing a computer to perform the method of claim 11.

* * * * *